# United States Patent Office 2,982,772
Patented May 2, 1961

2,982,772
OCTAHYDRO-5aH,10aH,4a,9a-EPOXYDIBENZO-p-DIOXIN-5a,10a-DIOL

Henry C. Godt, Jr., St. Louis, Mo., assignor to Monsanto Chemical Company, St. Louis, Mo., a corporation of Delaware No Drawing. Filed Jan. 12, 1959, Ser. No. 786,008

1 Claim. (Cl. 260—340.3)

This invention relates to the oxidation of cyclic alcohols and more specifically it relates to the new and useful compound which is produced by the nitric acid oxidation of cyclohexanol at low temperatures.

It has been found that when cyclohexanol is reacted with nitric acid at a temperature below about 35° C. there is produced adipomononitrolic acid and an appreciable quantity of a diol compound identified as octahydro - 5aH,10aH,4a,9a - epoxy - dibenzo - p - dioxin-5a,10a-diol having the formula

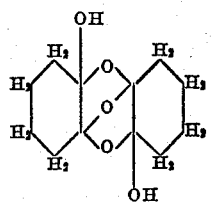

The reaction can be effected conveniently by slowly adding the cyclohexanol to the nitric acid. After all of the cyclohexanol has been added, the reaction mixture is maintained at a low temperature in order to facilitate the precipitation of the end product. After the precipitation is complete, the diol compound is recovered from the reaction mixture.

The diol compound of this invention is an exceedingly useful intermediate for the preparation of other organic compounds. For example, this diol compound can be hydrolyzed to yield 1,2-cyclohexanedione. Moreover, the reaction of the diol compound and phenylhydrazine in glacial acetic acid yields 1,2-cyclohexanedione phenylosazone. The diol compound is especially useful in the production of 6-oxo-1-cyclohexen-1-yl esters from the reaction of the diol and an acylating agent. This latter process is more completely described in application Serial No. 750,567, filed July 24, 1958, which is a continuation-in-part of application Serial No. 502,733, filed April 20, 1955, now abandoned.

The present application is a continuation-in-part of application Serial No. 502,731, filed April 20, 1955, now Patent No. 2,881,215.

The following specific examples are given to illustrate a method of preparing the novel compound of this invention. In these examples the term "parts" is employed to indicate parts by weight.

Example I

To a suitable reaction vessel there is added 70.5 (0.78 mole) parts of an aqueous solution of nitric acid containing 70% $HNO_3$ by weight. The nitric acid is stirred and cooled to about 15° C. and there is slowly added thereto 25 parts (0.25 mole) of cyclohexanol while stirring and maintaining the resulting mixture at 15° C. After all the cyclohexanol has been added, the reaction mixture is cooled to 0° C. and stirred for about 45 minutes, whereupon a yellow solid precipitates. The solid is filtered and extracted with ether to remove the adipomononitrolic acid. A white solid remains. This white solid is recrystallized from a methylethyl ketone-methanol solution (50–50) and dried.

The recovered white solid is identified as octahydro-5aH,10aH,4a,9a - epoxydibenzo - p - dioxin - 5a,10a-diol having the odor of burnt sugar and melting at 143° to 144° C. with decomposition.

Analysis.—Calc'd. for $C_{12}H_{18}O_5$: C, 59.47; H, 7.49.
Found: C, 59.58; H, 7.44.

Example II

Cyclohexanol (150 parts, 1.5 moles) is added to 567 parts (4.5 moles) of 50% nitric acid at 10 to 15° C. over a period of 2.5 hours with stirring. The mixture is cooled to 0° C. and stirred for three hours at this temperature. The precipitate is filtered and slurried with a large quantity of ether in order to dissolve the adipomononitrolic acid present. The ether solution is filtered and the filter cake is dried. There is obtained 72.7 parts (40% yield) of octahydro-5aH,10aH-4a,9a-epoxydibenzo-p-dioxin-5a,10a-diol, M.P. 144° C.

Analysis.—Calc'd. for $C_{12}H_{18}O_5$: C, 59.47; H, 7.49.
Found: C, 59.39; H, 7.46.

Example III

The procedure of Example II is repeated except that 30% nitric acid is employed in place of the 50% nitric acid. The quantity of the diol compound obtained corresponds to a yield of approximately 50% based on the cyclohexanol used.

The nitric acid employed herein can vary widely in concentration, however the use of nitric acid containing from 50% by weight of nitric acid and below is preferred. Readily available, low cost nitric acid of a concentration of 55% to 58%, as well as fortified nitric acids of above 60% may be used in the process of this invention. Concentrated nitric acids containing 70% or more $HNO_3$ may also be employed if desired. Relatively dilute nitric acid, i.e. of a concentration of from about 20% to about 50% is especially preferred.

The minimum mole ratio of nitric acid to cyclohexanol is 2 to 1. It is preferred that the mole ratio of nitric acid to cyclohexanol be within the range of 2.5–5 to 1. Higher ratios may be employed, however, such ratios favor the formation of the nitrolic acid over the diol compound.

The reaction is carried out at a temperature below about 35° C. and preferably below 20° C. A reaction temperature within the range of 10 to 15° C. is especially preferred. It is also preferred to reduce the temperature below 10° C. after all of the cyclohexanol has been added to facilitate the precipitation of the product.

After the reaction is complete the diol compound may be recovered from the reaction mixture by any method well known to those skilled in the art. Preferably, the reaction mixture is filtered and then slurried with a liquid which is a solvent for the nitrolic acid. The solvent solution is then filtered and the filter cake is then dried.

While this invention has been described with respect to certain embodiments, it is not so limited, and it is to be understood that variations and modifications thereof which are obvious to those skilled in the art may be made without departing from the spirit or scope of this invention.

What is claimed is:

Octahydro - 5aH,10aH,4a,9a - epoxydibenzo - p - dioxin-5a,10a-diol.

References Cited in the file of this patent
UNITED STATES PATENTS

| | | |
|---|---|---|
| 1,960,211 | Perkins et al. | May 22, 1934 |
| 2,439,513 | Hamblet et al. | Apr. 13, 1948 |